US012671932B2

(12) United States Patent
Hsu et al.

(10) Patent No.: US 12,671,932 B2
(45) Date of Patent: Jun. 30, 2026

(54) WIRELESS HEADPHONE AND HIDDEN COVER

(71) Applicant: Merry Electronics(Shenzhen) Co., Ltd., ShenZhen (CN)

(72) Inventors: Ting Chia Hsu, Taichung (TW); Ting Hsien Hsu, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 127 days.

(21) Appl. No.: 18/810,554

(22) Filed: Aug. 21, 2024

(65) Prior Publication Data

US 2026/0019735 A1 Jan. 15, 2026

(30) Foreign Application Priority Data

Jul. 9, 2024 (TW) ................................ 113125711

(51) Int. Cl.
*H04R 1/10* (2006.01)

(52) U.S. Cl.
CPC .................................. *H04R 1/1066* (2013.01)

(58) Field of Classification Search
CPC .................................................... H04R 1/1066
USPC .................................................. 381/370–381
See application file for complete search history.

(56) References Cited

U.S. PATENT DOCUMENTS

2002/0021800 A1* 2/2002 Bodley .................. H04M 1/05 379/430
2004/0190745 A1* 9/2004 Chen .................... H04R 1/1066 381/381

* cited by examiner

*Primary Examiner* — Suhan Ni
(74) *Attorney, Agent, or Firm* — JCIPRNET

(57) ABSTRACT

A wireless headphone including a housing, an ear part, and a hidden cover is provided. The housing has a receiving space for mounting a battery. The ear part is disposed at a side of the housing. The hidden cover is disposed at the housing and adjacent to the ear part, and the hidden cover has a base and a covering member. The base is connected to the housing, and the ear part is sleeved at a side of the base. The covering member is movably disposed at the base and adjacent to the ear part. In an open mode, the covering member is adapted to slide along the base away from the housing and expose the battery. In a closed mode, the covering member is adapted to slide along the base to be in contact with the ear part and the housing and shield the battery.

13 Claims, 9 Drawing Sheets

WIRELESS HEADPHONE AND HIDDEN COVER

CROSS-REFERENCE TO RELATED APPLICATION

This application claims the priority benefit of Taiwan application serial no. 113125711, filed on Jul. 9, 2024. The entirety of the above-mentioned patent application is hereby incorporated by reference herein and made a part of specification.

BACKGROUND OF THE INVENTION

Field of the Invention

The invention relates to a wireless headphone, and in particular to a wireless headphone having a replaceable battery.

Description of Related Art

Existing covers of portable electronic products used to accommodate batteries are divided into the following types based on different fixing methods: snap-on type, screw-on type, adhesive type, and rotating type. Via the above fixing methods, the cover is fixed to the main body of the product, and the battery is confined within the main body.

However, the different types of covers mentioned above are not suitable for wireless headphones. The reason is that wireless headphones aim for small size, and are therefore not suitable for snap-on covering members or screw-on covering members. In order to achieve the desired volume, the cover becomes too small and difficult to remove.

Furthermore, if the wireless headphone adopts an adhesive covering member, the user is unable to disassemble and assemble the adhesive covering member by themselves. In addition, the rotating covering member is limited in structure and tends to increase in volume, thus affecting the wearing comfort of the wireless headphone.

Therefore, developing a covering member suitable for wireless headphones has become an important object in the art.

SUMMARY OF THE INVENTION

The invention provides a wireless headphone adopting a hidden cover and having the functions of small size, waterproofing, and manual unfolding.

A wireless headphone of the invention includes a housing, an ear part, and a hidden cover. The housing has a receiving space for mounting a battery. The ear part is disposed at a side of the housing. The hidden cover is disposed at the housing and adjacent to the ear part, and the hidden cover has a base and a covering member. The base is connected to the housing, and the ear part is sleeved at a side of the base. The covering member is movably disposed at the base and adjacent to the ear part. In an open mode, the covering member is adapted to slide along the base away from the housing and expose the battery. In a closed mode, the covering member is adapted to slide along the base to be in contact with the ear part and the housing and shield the battery.

In an embodiment of the invention, the base has two slide grooves formed at two opposite sides of the base, and the covering member has two columns movably disposed at the two slide grooves respectively.

In an embodiment of the invention, the base has four first protrusions and four second protrusions respectively formed in corresponding two slide grooves, the plurality of first protrusions are close to an entrance and exit of the plurality of slide grooves, and the plurality of second protrusions are away from the entrance and exit.

In an embodiment of the invention, in the closed mode, the two columns of the covering member are located between the plurality of first protrusions and the housing, and the covering member is engaged with an outer wall surface of the housing.

In an embodiment of the invention, in the open mode, the two columns of the covering member pass through the plurality of first protrusions along the two slide grooves and are separated from the housing.

In an embodiment of the invention, the two columns of the covering member pass through a plurality of second protrusions along the two slide grooves and are pivoted relative to the base, so that the covering member is unfolded at an included angle relative to the housing to expose the battery.

In an embodiment of the invention, the housing has a protruding rib formed at an outer wall surface of the housing surrounding the battery, and the covering member has a slot formed at an inner wall surface of the covering member surrounding the battery and adapted to receive the protruding rib.

In an embodiment of the invention, the hidden cover has a latch, and in the closed mode, the latch penetrates the covering member and the base.

The invention provides a hidden cover suitable for use in various portable electronic devices such as headphones, watches, and glasses.

A hidden cover of the invention includes a base and a covering member. The base has two slide grooves formed at two opposite sides of the base. The covering member has two columns movably disposed at the two slide grooves respectively. The two columns are adapted to slide along the two slide grooves to switch to an open mode or a closed mode.

In an embodiment of the invention, the base has four first protrusions and four second protrusions respectively formed in corresponding two slide grooves, the plurality of first protrusions are close to an entrance and exit of the two slide grooves, and the plurality of second protrusions are away from the entrance and exit.

In an embodiment of the invention, in the closed mode, the two columns of the covering member are located between the plurality of first protrusions and the entrance and exit.

In an embodiment of the invention, in the open mode, the two columns of the covering member pass through the plurality of first protrusions along the two slide grooves, and then the two columns of the covering member pass through the plurality of second protrusions along the two slide grooves and are pivoted relative to the base.

In an embodiment of the invention, a latch is further included, and in the closed mode, the latch penetrates the covering member and the base.

Based on the above, the wireless headphone of the invention adopts the hidden cover. In the closed mode, the covering member is adapted to slide along the base to be in contact with the ear part and the housing and shield the battery. In the open mode, the covering member is adapted to slide along the base away from the housing and expose the battery. Therefore, the wireless headphone has the functions of battery replacement and small size.

Furthermore, the hidden cover is suitable for portable electronic devices such as headphones, watches, and glasses, allowing users to manually unfold the covering member to mount or remove the battery.

DESCRIPTION OF THE EMBODIMENTS

Figure 1A:
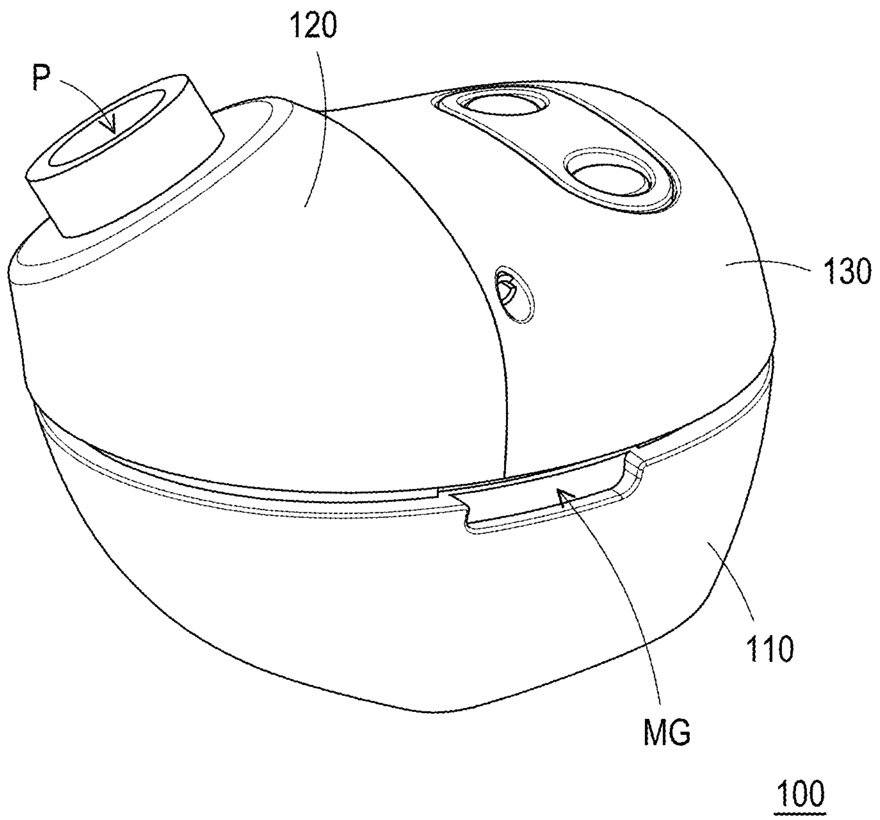
FIG. 1A is a schematic perspective view of a wireless headphone in a closed mode according to an embodiment of the invention.
Figure 1B:
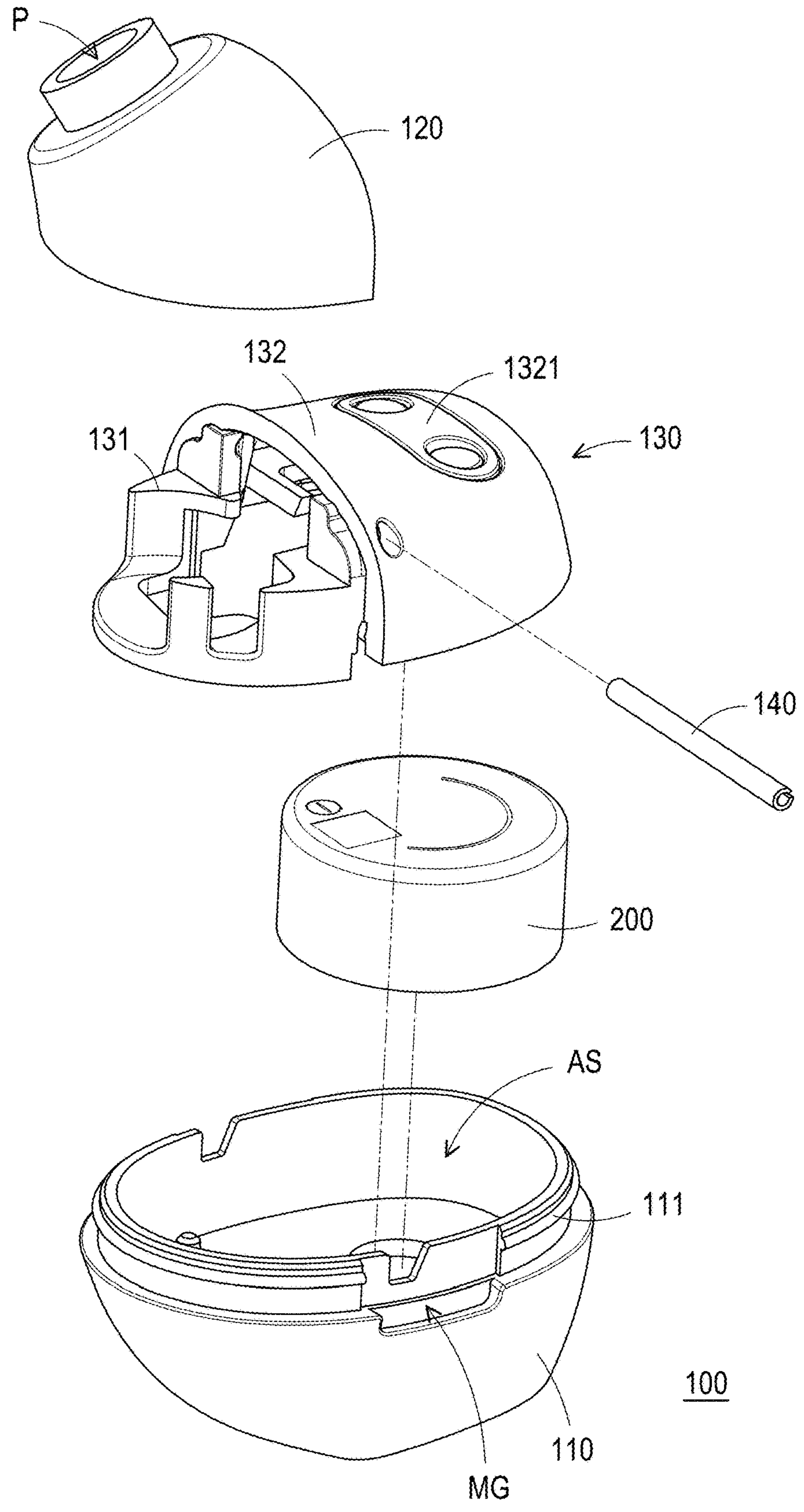
FIG. 1B is an exploded schematic diagram of the wireless headphone of FIG. 1A.

FIG. 1A is a schematic perspective view of a wireless headphone in a closed mode according to an embodiment of the invention. FIG. 1B is an exploded schematic diagram of the wireless headphone of FIG. 1A.

Referring to FIG. 1A and FIG. 1B, the wireless headphone of the invention adopts an earbud type and Bluetooth transmission. In other embodiments, the wireless headphone may also adopt an ear canal type or an earhook type, depending on the requirements.

Referring to FIG. 1A and FIG. 1B, a wireless headphone 100 includes a housing 110, an ear part 120, and a hidden cover 130.

The housing 110 has a receiving space AS for mounting a battery 200, a Bluetooth chip, a touch sensor, a radio element, a dynamic unit, etc. The ear part 120 is in disposed at a side of the housing 110 and has a transmission channel P connected to the receiving space AS. The transmission channel P is used to transmit the sound emitted by the wireless headphone 100 to the ears of the user.

The hidden cover 130 is disposed at the housing 110 and adjacent to the ear part 120, and the hidden cover 130 has a base 131 and a covering member 132. The base 131 is partially located in the receiving space AS of the housing 110 and connected to the housing 110, the ear part 120 is sleeved at a side of the base 131 to fix the base 131 to the housing 110, and the covering member 132 is movably disposed at the base 131 and adjacent to the ear part 120 and the housing 110.

Figure 2A:
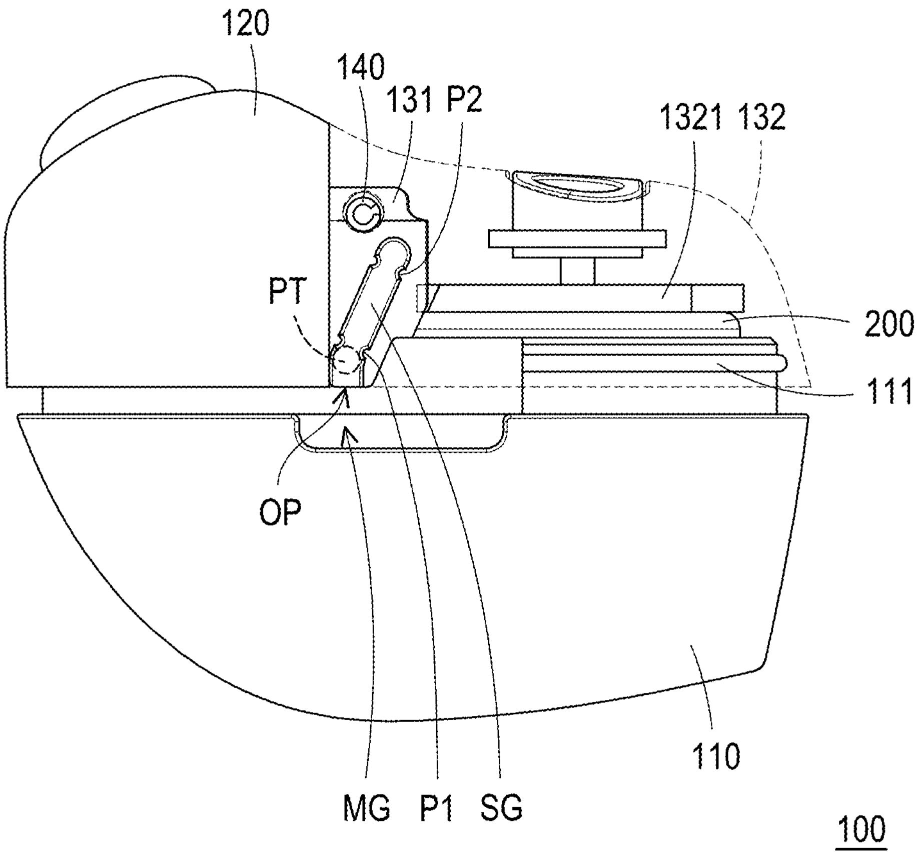
FIG. 2A to FIG. 2C are schematic side plan views of the wireless headphone of FIG. 1A switching from the closed mode to an open mode.
Figure 2B:
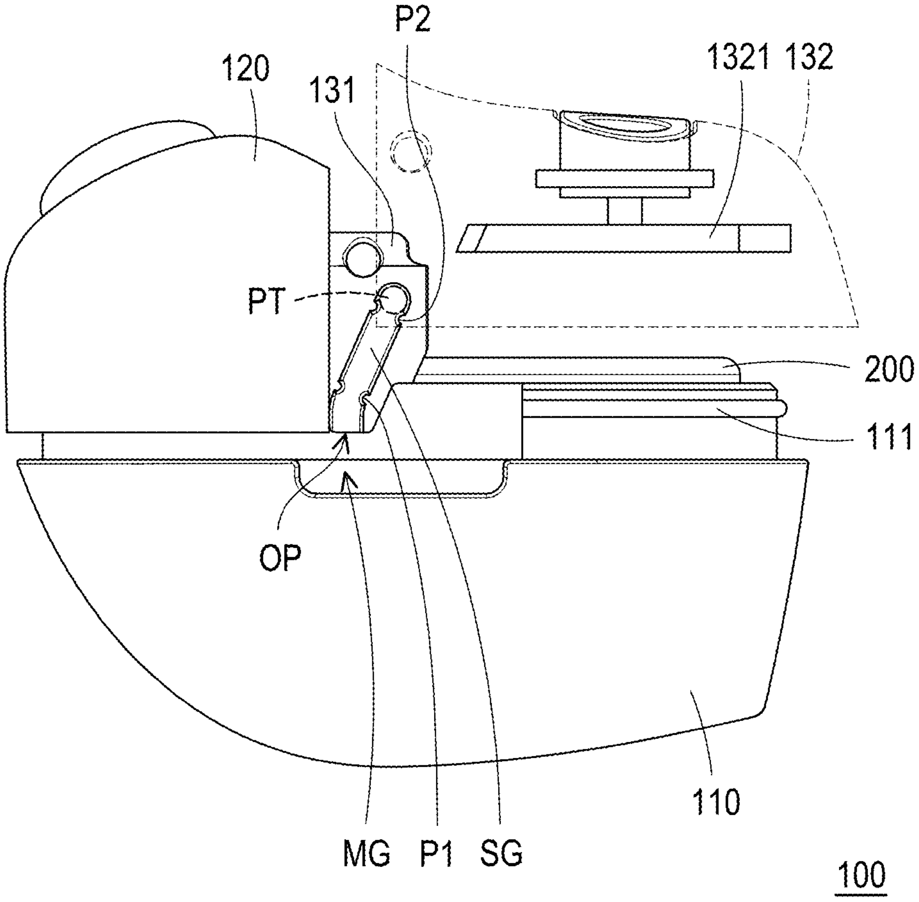
Figure 2C:
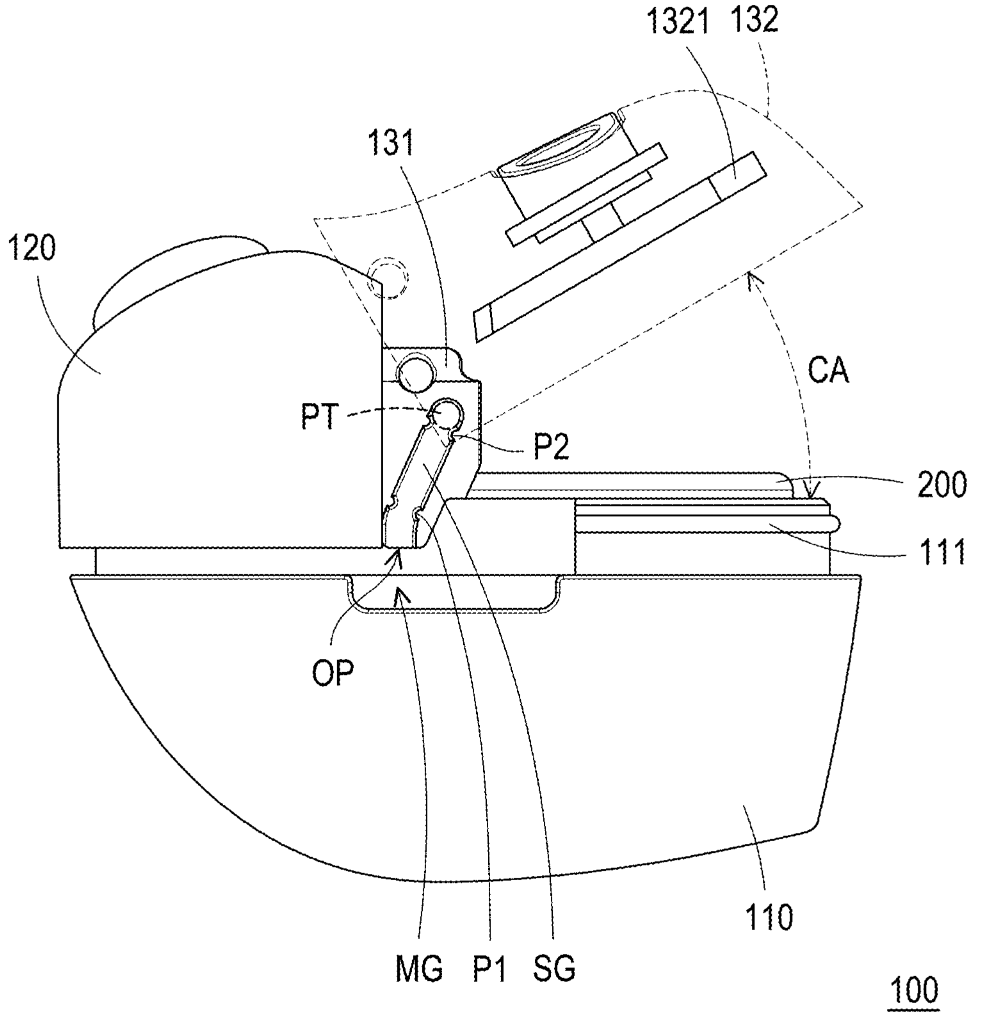
Figure 2D:
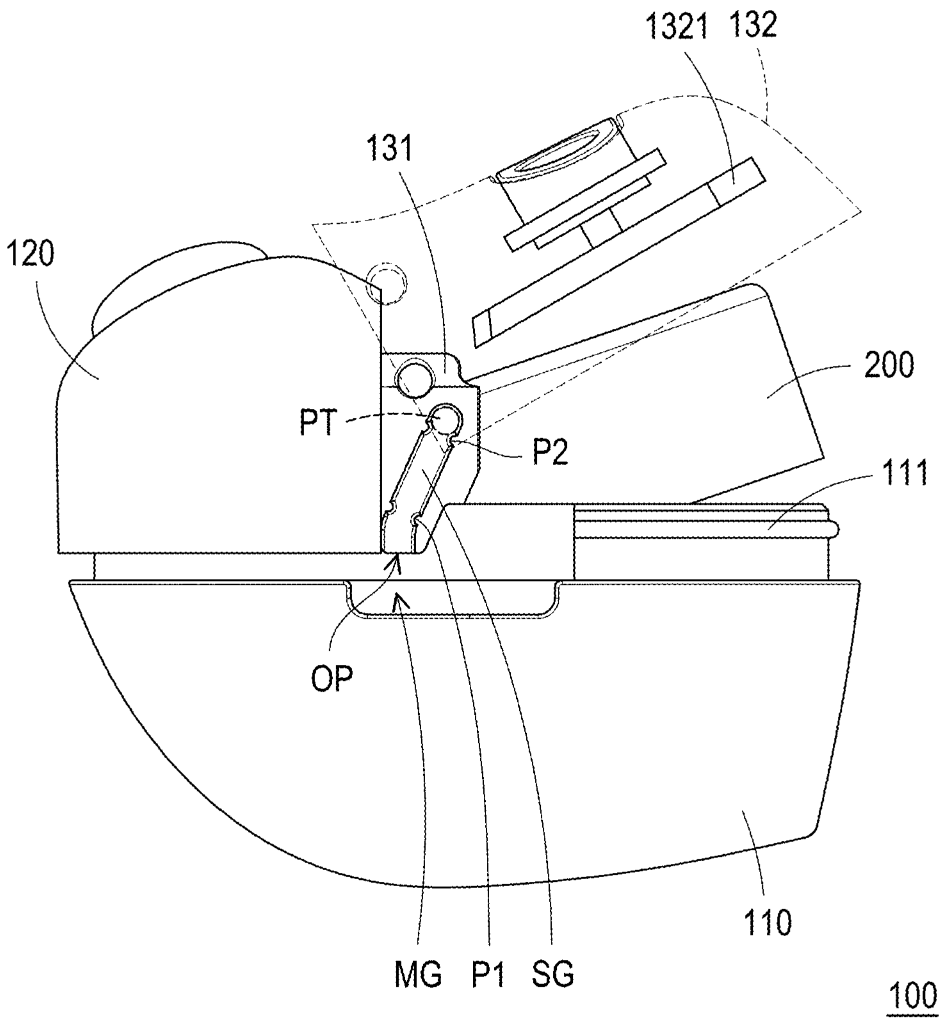
FIG. 2D is a schematic side plan view of the wireless headphone of FIG. 2C with the battery removed.

FIG. 2A to FIG. 2C are schematic side plan views of the wireless headphone of FIG. 1A switching from the closed mode to an open mode. FIG. 2D is a schematic side plan view of the wireless headphone of FIG. 2C with the battery removed.

Referring to FIG. 1A, FIG. 1B, and FIG. 2A, in the closed mode, the covering member 132 is adapted to slide downward along the base 131 to be in contact with the ear part 120 and the housing 110 and shield the battery 200. In addition, the covering member 132 has a stop plate 1321 disposed in the covering member 132. When the covering member 132 shields the battery 200, the stop plate 1321 is in contact with the battery 200 to prevent the battery 200 from shaking due to external force.

Referring to FIG. 2B and FIG. 2C, in the open mode, the covering member 132 is adapted to slide upward along the base 131 to be away from the housing 110 and expose the battery 200. Then, referring to FIG. 2D, the user may manually remove the battery 200 for replacement.

Figure 3A:
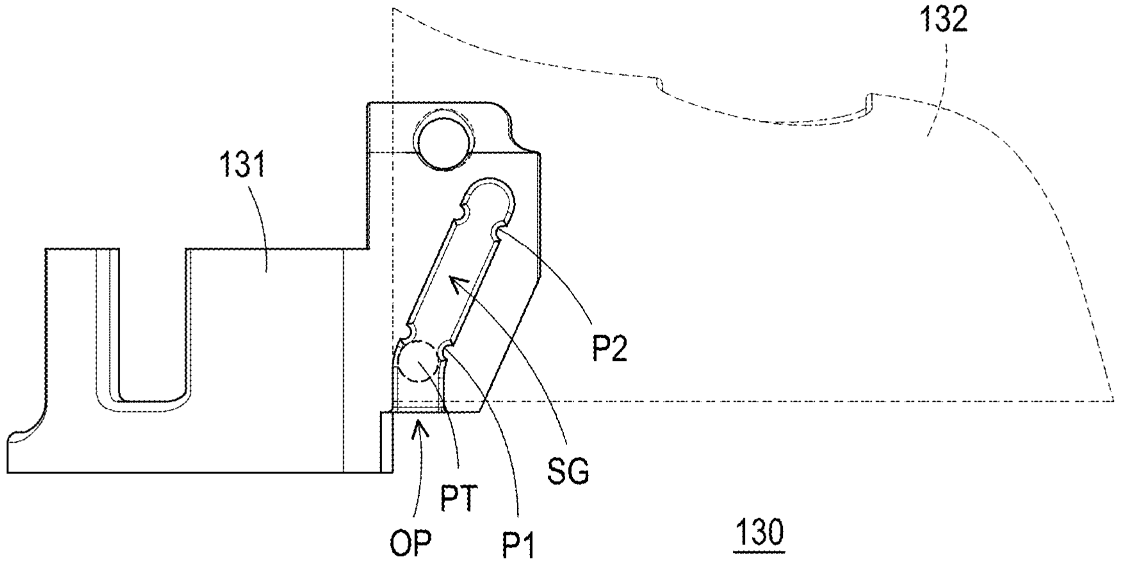
FIG. 3A is a schematic perspective view of the hidden cover of FIG. 1A in the closed mode.
Figure 3B:
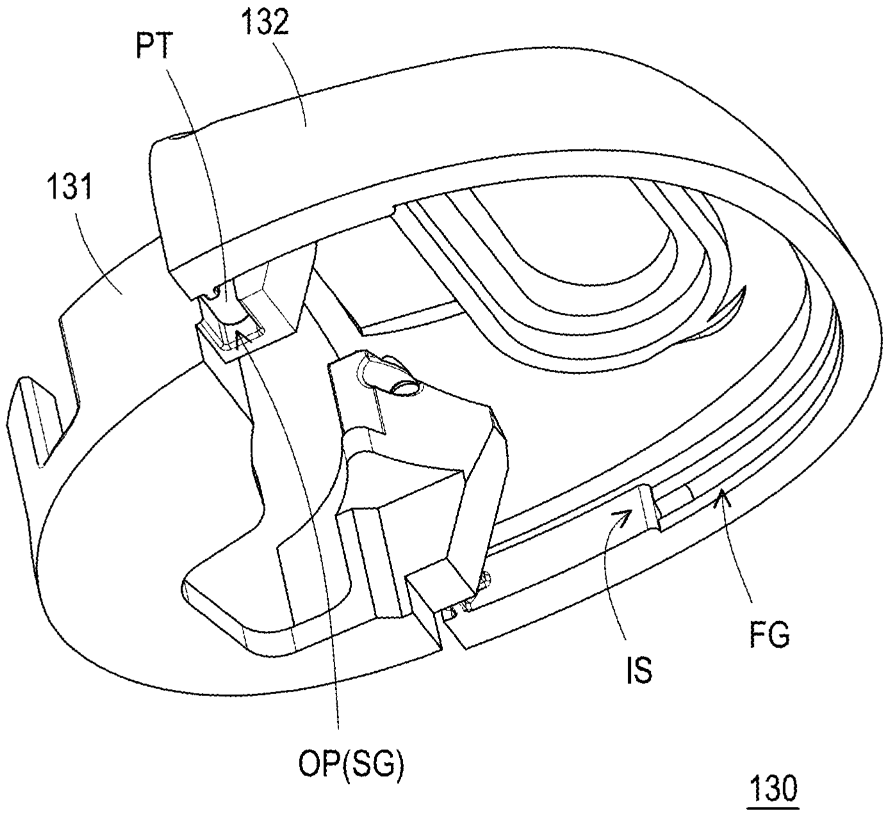
FIG. 3B is a schematic perspective view of the hidden cover of FIG. 3A.

Referring to FIG. 2A, FIG. 3A, and FIG. 3B, the base 131 has two slide grooves SG formed at two opposite sides of the base 131. The covering member 132 has two columns PT formed in the opposing inner wall surfaces of the covering member 132, and the two columns PT are movably disposed at the two slide grooves SG respectively. The covering member 132 is moved relative to the base 131 along the two slide grooves SG via the two columns PT.

Furthermore, the base 131 has four first protrusions P1 and four second protrusions P2 respectively formed in the corresponding two slide grooves SG. The plurality of first protrusions P1 are close to an entrance and exit OP of the corresponding slide grooves SG, and the plurality of second protrusions P2 are away from the entrance and exit OP.

Referring to FIG. 2A and FIG. 3B, in the closed mode, the two columns PT of the covering member 132 are located between the plurality of first protrusions P1 and the housing 110, and the covering member 132 is engaged with an outer wall surface OS of the housing 110.

Referring to FIG. 2B and FIG. 3B, in detail, the housing 110 has a protruding rib 111. The protruding rib 111 is formed at the outer wall surface OS of the housing 110 surrounding the battery 200, and the covering member 132 has a slot FG formed at an inner wall surface IS of the covering member surrounding the battery 200. In the closed mode, the covering member 132 has the slot FG to receive and engage the protruding rib 111 of the housing 110.

Further, referring to FIG. 1A and FIG. 1B, the wireless headphone 100 has a latch 140. In the closed mode, the latch 140 penetrates the covering member 132 and the base 131 so that the two may not be moved or unfolded relative to each other, thereby allowing the covering member 132 to be tightly attached to the housing 110 to shield the battery 200. The housing 110 has a toggle groove MG formed at the outer edge of the casing 110 and aligned with the entrance and exit OP of one of the slide grooves SG. Therefore, the user may apply external force to the covering member 132 via the toggle groove MG.

Figure 3C:
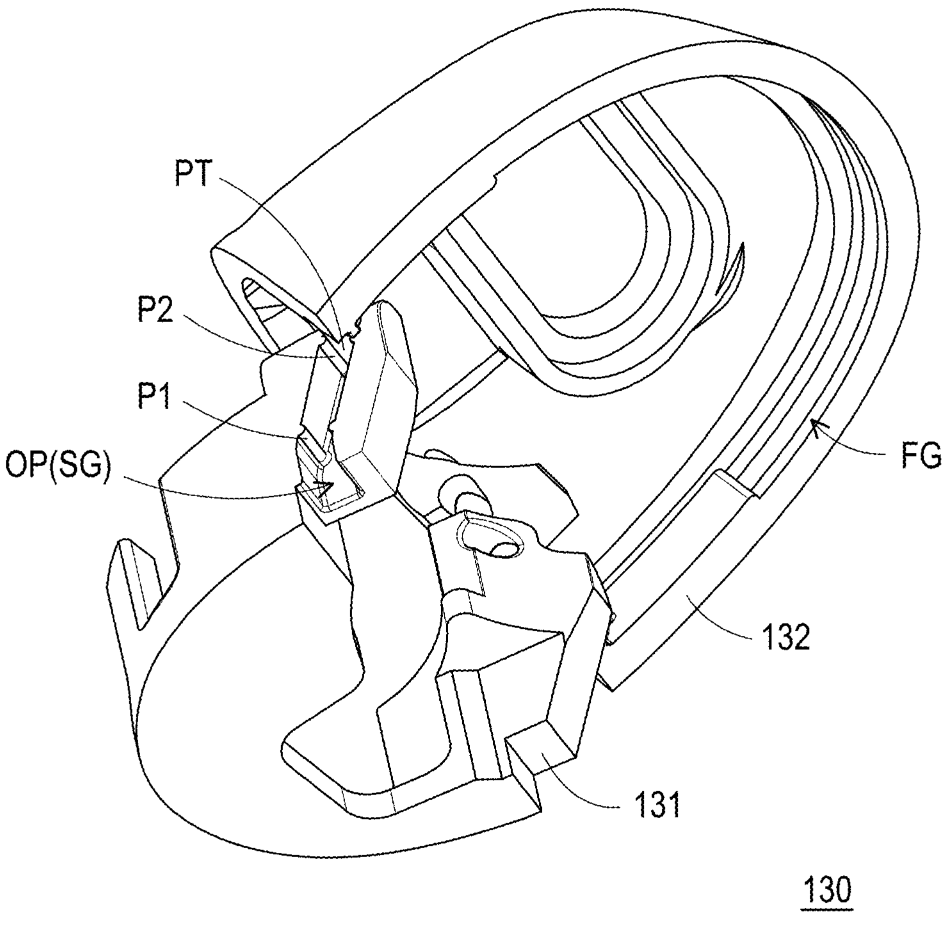
FIG. 3C is a schematic rear plan view of the hidden cover of FIG. 3B switched to the open mode.

Referring to FIG. 2B and FIG. 3C, in the open mode, first, the latch 140 is removed to unlock the covering member 132 and the base 131, and then the user applies force to the covering member 132 via the toggle groove MG, so that the two columns PT pass through the plurality of first protrusions P1 and the plurality of second protrusions P2 along the two slide grooves SG and are separated from the housing 110. At this time, the two columns PT of the covering member 132 are located at the ends of the two slide grooves SG after passing through the plurality of second protrusions P2, then, the two columns PT are driven to be rotated in the two slide grooves SG, so that the covering member 132 is pivoted relative to the base 131 until the covering member 132 is abutted against the ear part 120, then the covering member is unfolded by an included angle CA relative to the housing 110 to expose the battery 200. Referring to FIG. 2D, the battery 200 is lastly removed from the housing 110.

Referring to FIG. 2D to FIG. 2A, conversely, when the wireless headphone 100 is switched from the open mode to the closed mode, the battery 200 is mounted into the receiving space AS of the housing 110, the covering member

132 is rotated so that the covering member 132 is parallel to the housing 110, external force is applied to the covering member 132 so that the two columns PT slide along the two slide grooves SG and pass through the plurality of second protrusions P2 and the plurality of first protrusions P1 in sequence, so that the two columns PT are positioned at the entrance and exit OP, and the protruding rib 111 of the housing 110 is received and engaged via the slot FG. Lastly, the latch 140 is inserted through the covering member 132 and the base 131 so that the two may not be moved or expanded relative to each other, thus completing the closed mode.

Based on the above, the wireless headphone of the invention adopts the hidden cover. In the closed mode, the covering member is adapted to slide along the base to be in contact with the ear part and the housing and shield the battery. In the open mode, the covering member is adapted to slide along the base away from the housing and expose the battery. Therefore, the wireless headphone has the functions of battery replacement and small size.

Furthermore, the hidden cover is suitable for portable electronic devices such as headphones, watches, and glasses, allowing users to manually unfold the covering member to mount or remove the battery.

What is claimed is:

1. A wireless headphone, comprising:

a housing having a receiving space for mounting a battery;

an ear part disposed at a side of the housing; and a cover disposed at the housing and adjacent to the ear part, and the cover has:

a base connected to the housing, and the ear part is sleeved at a side of the base; and a covering member movably disposed at the base and adjacent to the ear part;

wherein in an open mode, the covering member is adapted to slide along the base away from the housing and expose the battery, wherein in a closed mode, the covering member is adapted to slide along the base to be in contact with the ear part and the housing and shield the battery.

2. The wireless headphone of claim 1, wherein the base has two slide grooves formed at two opposite sides of the base, and the covering member has two columns movably disposed at the two slide grooves respectively.

3. The wireless headphone of claim 2, wherein the base has four first protrusions and four second protrusions respectively formed in corresponding two slide grooves, the first protrusions are close to an entrance and exit of the slide grooves, and the second protrusions are away from the entrance and exit.

4. The wireless headphone of claim 3, wherein in the closed mode, the two columns of the covering member are located between the first protrusions and the housing, and the covering member is engaged with an outer wall surface of the housing.

5. The wireless headphone of claim 3, wherein in the open mode, the two columns of the covering member pass through the first protrusions along the slide grooves and are separated from the housing.

6. The wireless headphone of claim 5, wherein the two columns of the covering member pass through the second protrusions along the slide grooves and are pivoted relative to the base, so that the covering member is unfolded at an included angle relative to the housing to expose the battery.

7. The wireless headphone of claim 4, wherein the housing has a protruding rib formed at an outer wall surface of the housing surrounding the battery, and the covering member has a slot formed at an inner wall surface of the covering member surrounding the battery and adapted to receive the protruding rib.

8. The wireless headphone of claim 1, wherein the cover has a latch, and in the closed mode, the latch penetrates the covering member and the base.

9. A cover, disposed at a housing of a wireless headphone, and the cover comprising:

a base having two slide grooves formed at two opposite sides of the base; and a covering member having two columns movably disposed at the two slide grooves respectively, wherein the two columns are adapted to slide along the two slide grooves to switch to an open mode or a closed mode.

10. The cover of claim 9, wherein the base has four first protrusions and four second protrusions respectively formed in corresponding two slide grooves, the first protrusions are close to an entrance and exit of the slide grooves, and the second protrusions are away from the entrance and exit.

11. The cover of claim 10, wherein in the closed mode, the two columns of the covering member are located between the first protrusions and the entrance and exit.

12. The cover of claim 10, wherein in the open mode, the two columns of the covering member pass through the first protrusions along the slide grooves, and then the two columns of the covering member pass through the second protrusions along the slide grooves and are pivoted relative to the base.

13. The cover of claim 9, further having a latch, wherein in the closed mode, the latch penetrates the covering member and the base.

* * * * *